United States Patent
Haruta et al.

[15] 3,688,612
[45] Sept. 5, 1972

[54] MACHINE TOOL

[72] Inventors: Hiroshi Haruta, Tanashi; Katumi Ueno, Kawagoe, both of Japan

[73] Assignee: Citizen Watch Co., Ltd., Tokyo, Japan

[22] Filed: April 10, 1970

[21] Appl. No.: 27,288

[52] U.S. Cl. ..................... 82/21 B, 82/14 B, 82/19
[51] Int. Cl. ............................................. B23b 21/00
[58] Field of Search............ 82/19, 20, 21.2, 24, 14.2

[56] References Cited

UNITED STATES PATENTS

| | | |
|---|---|---|
| 3,066,561 | 12/1962 | Auerbach ..................... 82/19 |
| 2,343,914 | 3/1944 | Lloyd ........................ 82/20 X |
| 2,498,783 | 2/1950 | Bechler ........................ 82/19 |
| 3,203,287 | 8/1965 | Bergonzo ....................... 82/21 |

FOREIGN PATENTS OR APPLICATIONS

| | | |
|---|---|---|
| 1,002,542 | 8/1965 | Great Britain ................. 82/19 |
| 1,111,902 | 7/1961 | Germany ....................... 82/19 |

*Primary Examiner*—Leonidas Vlachos
*Attorney*—William D. Hall, Elliott I. Pollock, Fred C. Philpitt, George Vande Sande, Charles F. Steininger and Robert R. Priddy

[57] ABSTRACT

A machine tool comprising means for supporting and rotating a work piece means for supporting at least one tool for cutting said work piece, tool advancing means for moving said tool toward and away from said work piece, said tool advancing means including a pulse motor, cam means adapted to be driven by said pulse motor, and cam follower means provided on said tool supporting means for co-operation with said cam means, and control means for providing operating pulses for said pulse motor.

3 Claims, 16 Drawing Figures

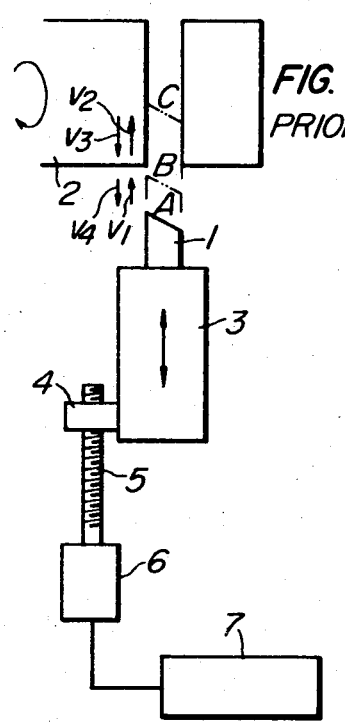
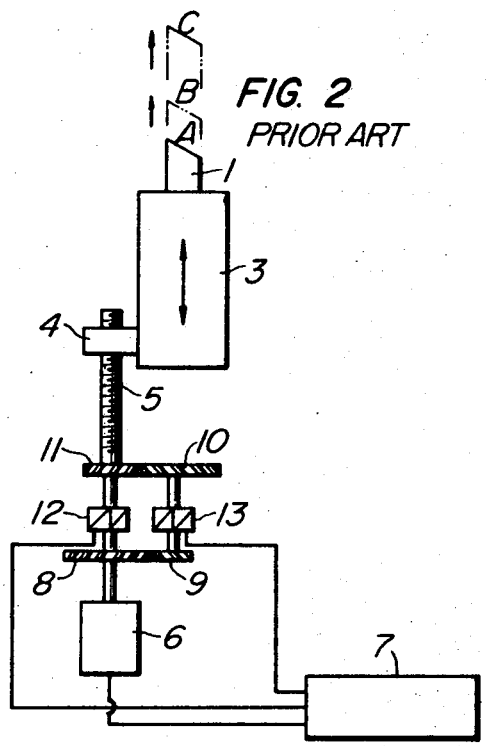
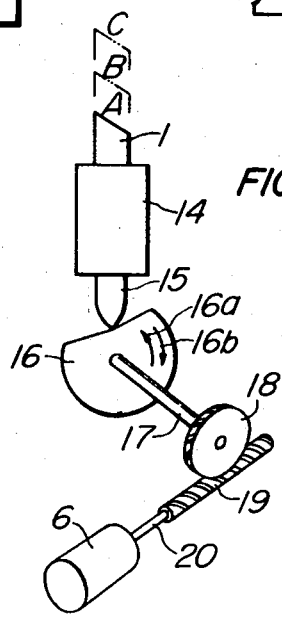

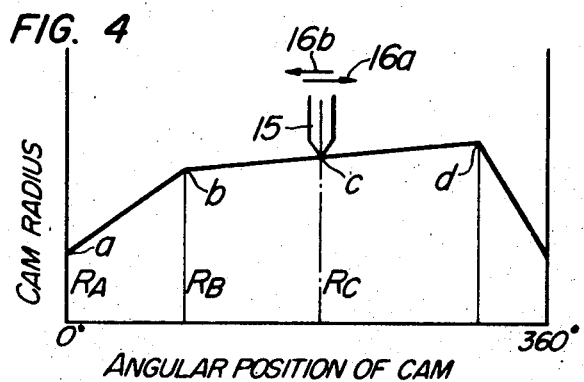
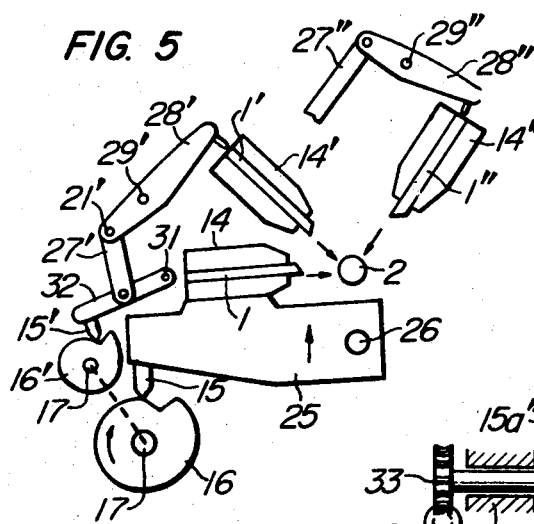
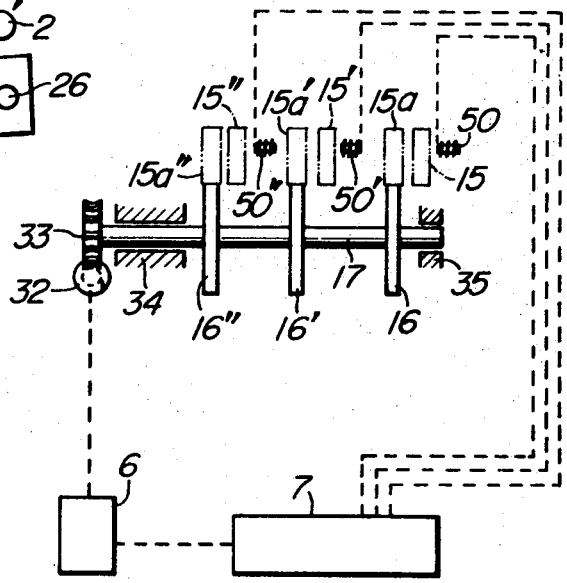

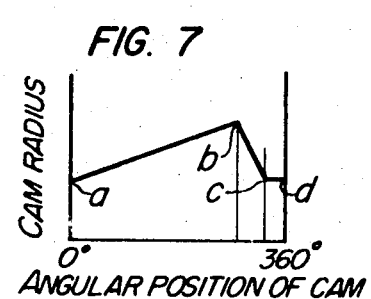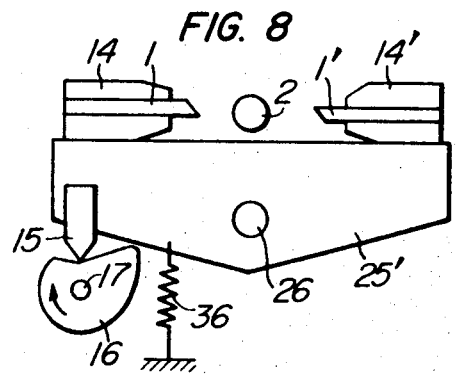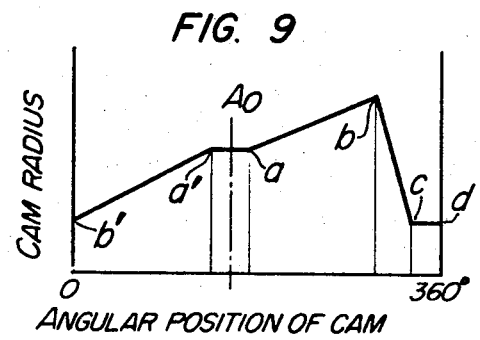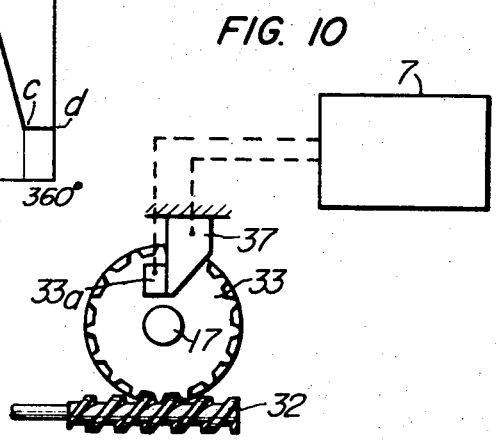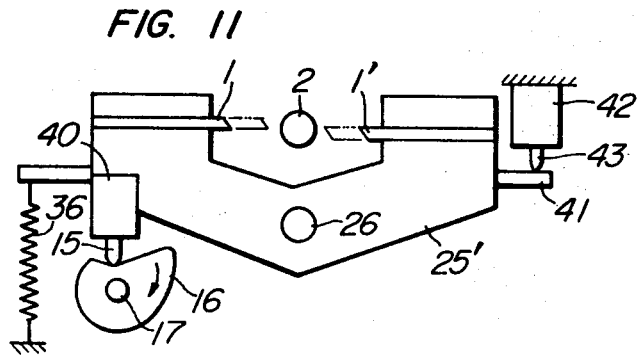

MACHINE TOOL

BACKGROUND OF THE INVENTION

The present invention relates to a machine tool, and more particularly to a machine tool of the type in which tool advancement is controlled by a digited command.

In a machine tool of the type described, it has been known to provide a pulse motor which, under the control of signal pulses of a control means, serves to move the tool toward and away from a work piece. In this type of machine tool, the speed of the advancing tool is determined by the pulse rate of the pulses given from the control means to the pulse motor. In general, it is desirable to advance the tool at a relatively high speed until it reaches a position where it is just about to contact the work piece, and thereafter at a relatively low speed which is determined in accordance with the finish of machining, however, due to the limited range of the pulse responding capacity of the pulse motor, the difference between the fast advancing speed and the slow advancing speed cannot be as large as desired. In order to eliminate this disadvantage, it has also been proposed to provide a system in which the output of the pulse motor can be transmitted to the tool advancing means through two separate paths, one being a path through which the output of the pulse motor can be transmitted directly without any speed reduction and the other being a path which includes a speed reduction means, whereby either of the high speed advancement and the low speed advancement can be achieved through the selection of either of the two paths. However, this type of system is rather complicated in structure and moreover undesirable errors will be increased.

SUMMARY OF THE INVENTION

The present invention is aimed to eliminate these undesirable disadvantages of the known apparatus, and is characterized in the employment of cam means in the tool advancing mechanism so that the difference in speed of movement between the high tool advancing speed and the low tool advancing speed can well be increased. According to the present invention, the cam means has such a shape that the portion corresponding to the period in which the tool is advanced from the start position to a position where it is just about to contact with the work piece is relatively steep in inclination and another portion corresponding to the period in which the tool contacts with the work piece is relatively slow in inclination.

By employing a cam means of the above mentioned shape, and by providing a pulse rate of the pulses given from the control means to the pulse motor which is as high as possible during high speed advancement of the tool, the difference between the speeds of the high speed tool advancement and the low speed tool advancement can be made sufficiently large.

The principle of the present invention can also be applied to a tool selecting mechanism of a machine tool by which a plurality of tools can be sequentially used. By applying the principle of the present invention to a tool selecting mechanism, a positive operation can be obtained with a relatively simple mechanism.

BRIEF DESCRIPTION OF THE DRAWINGS

In order that these and other objects and features of the present invention can well be understood, it will now be described by way of example taking reference to the accompanying drawings, in which;

FIG. 1 is a diagrammatical view of a conventional tool advancing mechanism for a machine tool;

FIG. 2 is a diagrammatical view of another conventional mechanism;

FIG. 3 is a diagrammatical view of a tool advancing mechanism embodying the principle of the present invention;

FIG. 4 is a diagram showing the shape of a cam employed in the mechanism shown in Figure;

FIG. 5 is a diagrammatical view of a tool selecting mechanism embodying the principle of the present invention;

FIG. 6 is a diagrammatical view showing the cam arrangement of the mechanism shown in FIG. 5;

FIG. 7 is a diagram showing the shape of a cam employed in the mechanism shown in FIGS. 5 and 6;

FIG. 8 is a diagrammatical view showing a modification of the mechanism shown in FIGS. 5 and 6;

FIG. 9 is a diagram showing the shape of a cam employed in the mechanism shown in FIG. 8;

FIG. 10 is a diagrammatical view showing an example of the stop means employed in the present invention;

FIG. 11 is a diagrammatical view showing a further modification of the present invention;

DETAILED DESCRIPTION OF THE PREFERRED EMBODIMENTS

Figure 12:
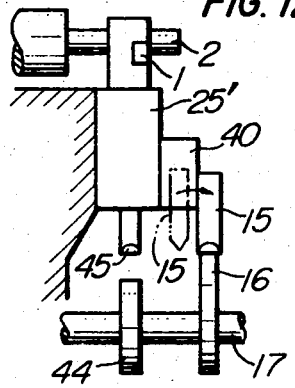
FIG. 12 is a diagrammatical view, as seen from the left, of the mechanism of FIG. 11.

Referring first to FIG. 1 which shows a typical example of a conventionally known lathe, the reference numeral 1 shows a tool, and 2 a work piece which is mounted on the lathe and rotated about its longitudinal axis. The tool 1 is secured to a tool holder 3 which is slidable radially to the rotational axis of the work piece 2. The tool holder 3 is so arranged that it can be moved by a nut 4 secured to the tool holder 3 and a screw 5 engaging the nut 4. The screw 5 is arranged so as to be driven by a pulse motor 6 which is controlled by a digital control means 7. In operation of the lathe, the tool is initially placed to the position shown by A in FIG. 1, then advanced to the position shown by B with a relatively high speed, and thereafter advanced to the position shown by C with a predetermined cutting speed. When the cutting is performed, the tool 1 is returned to the position B with a relatively slow speed and then to the position A with a relatively high speed. In general, the distance that the tool 1 is advanced when one pulse is applied to the pulse motor 6 is predetermined, so that the number of pulses required for advancing the tool from the position A to the position B and that required for advancing the tool from the position B to the position C is also determined. The same can also be applied when the tool 1 is returned from the position C to the position B then from the position B to the position A. Therefore, in order to make the speed of the tool 1 when it is moved from the position A to the position B greater than that when it is moved from the position B to the position C, the rate of pulses applied to the pulse motor when the tool is moved with a greater speed must be higher than that when the tool is moved with a smaller speed. However, in a precision machine tool such as for example a lathe for machining watch parts, since the dimension of the parts is relatively small, the distance that the tool is advanced by one pulse is normally limited to the order of 0.001 mm/pulse. On the other hand, a conventional pulse motor has the maximum pulse response characteristics of about 2000 pulses per second. Therefore, in the mechanism shown in FIG. 1, the advancing speed of the tool between the positions A and B cannot be made as high as desired.

In order to solve this problem, an arrangement as shown in FIG. 2 has been proposed. In this arrangement, a pulse motor 6 so arranged that it can drive a screw 5 through a clutch 12 and, alternatively, it can also drive the screw through a speed reduction mechanism comprising a gear 8 secured to the output shaft of the pulse motor 6, a gear 9, a clutch 13, a gear 10 and a gear 11 secured to the screw 5. Therefore, through the selective engagement of either the clutch 12 or 13, the tool 1 can be advanced at a fast advancing or a slow cutting speed. However, in the arrangement shown in FIG. 2, the power transmission mechanism is relatively complicated and undesirable errors will be produced.

The present invention is intended to eliminate the above mentioned disadvantages of the known arrangements and intended to advance the tool through cam means. Referring to FIG. 3 which shows one embodiment of the present invention, a tool 1 is secured to a tool holder 14 which is slidable radially to the rotational axis of a work piece (not shown). The tool holder 14 is provided with a cam follower 15 which is adapted to ride on the peripheral cam edge of a rotatable cam 16. The cam 16 is secured to one end of a cam shaft 17, while the other end of the cam shaft 17 has a worm wheel 18 secured thereto. The worm wheel 18 is arranged to mesh with a worm 19 provided on the output shaft 20 of the pulse motor 6. The cam 16 is shaped substantially as shown in FIG. 4.

In operation of the embodiment of the present invention, the tool 1 is located at a start position A when the cam follower 15 rides on the point shown by $a$ in FIG. 4. As the cam 16 is rotated by the pulse motor 6, the cam follower 15 moves along the cam edge until it reaches the point as shown by $b$ in FIG. 4. This point corresponds to the position of the tool shown by B in FIG. 3. Since the cam 16 is so shaped that the cam edge is relatively steep in slope between the points $a$ and $b$, the tool 1 is advanced at a relatively high rate, for example, by 0.005 mm per one pulse. The slope of the cam 16 is relatively gentle between the points $b$ and $c$ so that, when the cam follower 15 rides on the portion between the points $b$ and $c$ of the cam 16, the tool 1 is advanced at a relatively slow rate, for example, by 0.001 mm per one pulse. During the period when the tool is advanced from the position A to the position B, or vice versa, the pulse motor 6 is supplied by a control means with a relatively high rate of pulses such as 2,000 pulses per second whereby the cam 16 is rotated in the direction shown by an arrow 16a or in the reverse direction as the case may be at a relatively high speed such as 10 mm/sec. When the tool 1 passes through the position B, the advancing rate of the tool is decreased to, for example, 0.001 mm per one pulse and the rate of the pulses applied to the motor 6 is also decreased to such a value that is required to obtain a tool advance speed which is desirable for a particular machining operation.

When the tool 1 arrives at the position C and the cutting stroke is completed, a reversing pulse is applied to the pulse motor 6, whereby the cam 16 is caused to rotate an the direction shown by an arrow 16b to cause the tool 1 to be retracted. During the return stroke of the tool 1, the speed of the tool between the positions C and B is controlled to an appropriate value by controlling the pulse rate in accordance with the machining condition, while between the positions B and A, the tool 1 is returned at a relatively high speed by applying a higher pulse rate such as 2,000 pulses per second.

FIGS. 5 and 6 show an example in which the principle of the present invention is applied to a tool selecting mechanism of a machine tool. In the drawings, a work piece 2 is mounted rotatably and axially adjustably on a lathe and is continuously rotated during operation about its longitudinal axis with its longitudinal position fixed at the adjusted position. Around the work piece 2, there are disposed a plurality of tools 1, 1' and 1" which are respectively secured to tool holders 14, 14' and 14" so that they are directed radially to the rotational axis of the work piece 2. The tool holder 14 is mounted on a swingable arm 25 pivotally supported on a shaft 26. The arm 25 has a cam follower 15 secured to the free end thereof. The cam follower 15 is adapted to engage with a cam 16 secured to a cam shaft 17, whereby the rotation of the cam shaft 17 causes through the action of the cam 16 the swinging movement of the arm 25 so as to move the tool 1 radially to the work piece 2.

The tool holder 14' for holding the tool 1' engages with one end of a swing lever 28' which is pivotable about a pivot shaft 29', the other end of the lever 28' being pivotally connected at 21' with one end of a push rod 27'. The other end of the push rod 27' is connected to the intermediate portion of a lever 32 which is in turn pivotally mounted at 31 on a stationary part of the lathe. The lever 32 has a cam follower 15' carried at the free end thereof and adapted to engage with a second cam 16' secured to the cam shaft 17. Therefore, as the cam shaft 17 is rotated to drive the cam 16', the lever 32 is caused to swing and the swinging movement of the lever 32 is transmitted through the push rod 27' and the swing lever 28' to the tool holder 14' so as to move the tool holder 14' and the tool 1' carried thereon radially to the work piece 2. The mechanism for actuating the tool 1" and its tool holder 14" is substantially the same as the above described mechanism.

Referring now to FIG. 6, the cam followers 15, 15' and 15" are movable along an axis parallel to the cam shaft 17 between positions where they engage with the co-operating cams 16, 16' and 16" respectively and other positions where they are disengaged from the cams. The movements of the cam followers 15, 15' and 15" are respectively caused by solenoids 50, 50' and 50". The pulse motor 6 is so arranged that it is supplied with operating pulses from the control means 7 and has an output shaft provided with a worm 32. The worm 32 is arranged so as to mesh with a worm wheel 33 secured to the cam shaft 17. The reference numerals 34 and 35 show bearings for the cam shaft 17. In FIG. 6, only the cam follower 15 is shown in engagement with the cam 16, the other cam followers 15' and 15" being in the positions where they are disengaged from the co-operating cams 16' and 16" respectively. FIG. 7 shows the shape of any one of the cams 15, 15' and 15".

In operation, the cam follower 15 is initially placed in a position of the cam 16 corresponding to the point $a$ in FIG. 7 and is moved along the line $a-b$ as the cam 16 is rotated so as to advance the tool holder 14 and the tool 1 supported thereon toward the work piece 2. When the cam follower reaches the point $b$ of the cam 16 and the cutting stroke is completed, the pulse motor 6 is supplied with reversing pulse so that the rotation of the cam 16 is reversed. Thus, the tool 1 is retracted and moved away from the work piece 2. Thereafter, the cam follower 15 is moved into disengagement from the cam 16 and one of the other cam followers such as the cam follower 15' is moved into engagement with the cam 16' so as to repeat a similar operating cycle.

The mechanism shown in FIGS. 5 and 6 may be disadvantageous in that the support mechanisms for the tool holders 14' and 14" are low in rigidity. One method for eliminating this problem is shown in FIG. 8. In this arrangement, the swing arm 25' extends to both sides of the pivot shaft 26 and carries at its opposite ends a tool holder 14 for supporting the tool 1 and a tool holder 14' for supporting the tool 1' respectively. In the drawing, the reference numeral 36 shows a spring for biasing the cam follower 15 toward the cam 16. In this arrangement, the cam 16 may be formed with two similar cam shapes disposed on the opposite sides of the center line $A_o$ as shown in FIG. 9. This arrangement is advantageous over that shown in FIGS. 5 and 6 in that two tool holders 14 and 14' are carried by a rigid swing arm 25'.

FIG. 10 shows stop means which may advantageously be employed in a novel cam mechanism in accordance with the present invention. In an automatic lathe, to which the present invention can be applied, since a plurality of working cycle are repeated, any error in the number of pulses applied to the pulse motor will be accumulated, resulting in an error in the positioning of the tool. Therefore, in accordance with the present invention, a stopper mechanism is preferably employed in order to determine the start position of the cam shaft.

In FIG. 10, the worm wheel 33 engages with the worm 32 which is driven by a pulse motor (not shown) and is provided at one of its side surfaces with a projection or stop member 33a which is adapted to abut a stationary stop member 37. The control means 7 is so constructed that, in operation, the pulses applied to the pulse motor during the return stroke of the tool are interrupted when the stop member 33a abuts the stationary stop member 37. By this arrangement, the start position of the tool can be determined exactly. The stop member 33a may be disposed on either of the cam shaft 17 or other member which rotates with the cam shaft 17.

Figure 13:
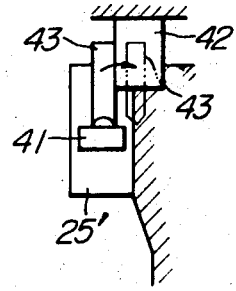
FIG. 13 is a diagrammatical view, as seen from the right, of the mechanism of FIG. 11.
Figure 16:
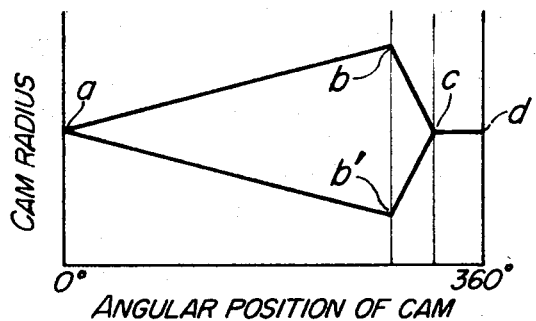

In the arrangement of FIG. 8, the swing arm 25' can be moved in either direction from the neutral position. An example of stop means for such an arrangement is shown in FIGS. 11, 12 and 13. FIG. 11 is a view similar to FIG. 8, but the tools 1 and 1' are mounted directly on the opposite ends of the swing arm 25'. On one end of the swing arm 25', there is carried a cam follower 15 through an adapter 40. The cam follower 15 is adapted to co-operate with the cam 16 on the cam shaft 17. The swing arm 25' has at its other end an extension 41 which co-operates with a stop member 43 supported on a stationary part of the lathe through an adapter 42. As shown in FIG. 12, the cam follower 15 is movable between a position shown by a solid line and another position shown by a broken line. In the position shown by the solid line in FIG. 12, the cam follower 15 rides on the cam 16, while in the position shown by the broken line, it is disengaged from the cam 16. Further, as shown in FIG. 13, the stop member 43 is movable between a position shown by a solid line and another position shown by a broken line. In the position shown by the solid line in FIG. 13, the stop member 43 can abut the extension 41 of the swing arm 25' while, in the position shown by the broken line, it is offset from said extension 41. The cam follower 15 and the stop member 43 can be similar in shape. The cam shaft 17 further carries a second cam 44 secured thereto. A cam follower 45 provided on the swing arm 25' co-operates with the cam 44. The cam 16 has a shape corresponding to the line $a$-$b$-$c$-$d$ in FIG. 16, while the cam 44 has a shape corresponding to the line $a$-$b'$-$c$-$d$.

Figure 14:
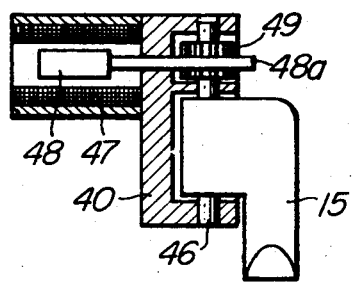
FIGS. 14 and 15 show the cam follower actuating mechanism employed in the mechanism shown in FIG. 11, with parts broken away in order to show the interior of the mechanism; and, FIG. 16 is a diagram showing the shape of a cam employed in the mechanism shown in FIG. 11.
Figure 15:
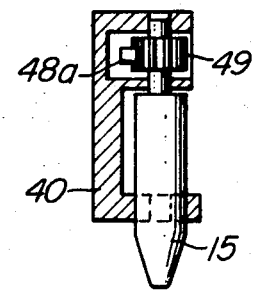

The mounting structure of the cam follower 15 is shown in FIGS. 14 and 15 and the stop member 43 can also be mounted by a similar mechanism. In FIGS. 14 and 15, the cam follower 15 is mounted rotatably about a vertical axis by means of a vertical shaft 46 provided in the adapter 40 on the swing arm 25' and is movable between the operative position shown in FIG. 14 and the inoperative position shown in FIG. 15. Within the swing arm 25', there is disposed a solenoid coil 47 and a plunger 48 which is caused to move axially by means of the solenoid coil 47. The plunger 48 is formed at its distal end with a rack 48a which meshes with a pinion 49 secured to the vertical shaft 46. Thus, by energizing the solenoid coil 47, the cam follower 15 can be moved through the plunger 48 and the vertical shaft 46 from the operative position to the inoperative position or vice veraa.

In operation, the cam follower 15 and the stop member 43 are placed in their operative positions and then the cam shaft 17 is rotated as in the previous embodiments. In this instance, since the stop member 43 can engage with the extension 41 of the swing arm 43 to limit the counter-clockwise rotation of the arm 25' the cam follower 45 cannot engage with the cam 44. Thus, only the cam 16 can serve its function to move the tool 1 toward the work piece 2. When the machining operation by the tool 1 is completed, the cam follower 15 and the stop member 43 are moved to the inoperative position. Thus, the swing arm 25' is rotated counter-clockwise under the influence of the spring 36 until the cam follower 45 comes into engagement with the cam 44. Therefore, the tool 1' is caused to move toward the work piece 2. When a tool other than the tool 1 and 1' is used, the cam follower 15 is placed at the inoperative position and the stop member 43 at the operative position.

The present invention has thus been described with reference to preferred embodiments, however, it is in no way limited to the details of the illustrated structures but intended to cover all of the modifications and the changes which will fall within the scope of the appended claims.

We claim:

1. A machine tool comprising:
means for supporting a workpiece;
a plurality of tools;
means for supporting each of said tools;
tool advancing means for moving each said tool toward and away from said workpiece and including a cam shaft, driving means for reciprocatingly rotating said cam shaft, a plurality of cams mounted on said cam shaft, and cam followers each mounted on one of said tool support members for cooperation with one of said cams;
control means for controlling said driving means,
and means for selecting said cams whereby the repeated reciprocating rotation of said cam shaft sequentially moves said tools one by one into operation through the selected cam.

2. A machine tool comprising,
means for supporting and rotating a workpiece,
a plurality of tool holders movable substantially radially relative to the rotating axis of said workpiece,
a cam shaft,
driving means for reciprocatingly rotating said cam shaft,
a plurality of cams mounted on said cam shaft each for cooperation with one of said tool holders,
means for selectively operatively connecting each said cam with a respective one of said tool holders,
control means for controlling said driving means,
and means for bringing a selected one of the tool holders into engagement with the corresponding cam upon completion of each reciprocating rotation of the cam shaft so that the tools are sequentially brought into operation.

3. A machine tool comprising,
means for supporting and rotating a workpiece,
a swing arm mounted pivotally about an axis offset from the rotating axis of said workpiece,
a pair of tools respectively carried at the opposite ends of said swing arm so as to project toward said work-piece,
a pair of cams,
a pair of cam followers,
one of said cam followers being selectively movable between operative and inoperative positions,
spring means for biasing said cam followers toward said cams,
motor means for reciprocatingly and repeatedly rotating said cams,
control means for controlling the motor means,
stop means movable between operative and inoperative positions and adapted to engage in its operative position with said swing arm to limit the swinging movement of the arm in one direction,
means for moving both said stop means and said one cam follower between their operative and inoperative positions,
and means for alternately bringing said one cam follower and said stop means into the operative position upon completion of each reciprocating rotation of said cams.

* * * * *